Dec. 19, 1967   R. J. MEDKEFF ET AL   3,358,898
REPAIR TAPE
Filed Jan. 27, 1965

INVENTORS
RUSSELL J. MEDKEFF
JAMES S. JACKSON

BY *William E. Cleaver*

ATTORNEY

United States Patent Office 3,358,898
Patented Dec. 19, 1967

3,358,898
REPAIR TAPE
Russell J. Medkeff, 235 Old Eagle School Road, Wayne, Pa. 19087, and James S. Jackson, 40 Overhill Circle, Media, Pa. 19063
Filed Jan. 27, 1965, Ser. No. 428,459
4 Claims. (Cl. 228—56)

ABSTRACT OF THE DISCLOSURE

The present device provides a base material which is formed into an elongated strand, i.e., tape-like in shape and which is further tension formed. Upon each outer surface of the base tape there is coated a layer of solder and an associated layer of solder flux. The tension characteristic causes the tape to wind itself around the pipe, or similar element which is to be repaired. The tape holds thereat while heat is applied to melt the same and form a solid mass.

---

This invention relates to tape means for repairing or coupling pipes, rods and structures of the like and more particularly to a tape means which employs adhesive material that is capable of being formed into a solid mass.

At present, when a pipe, such as an ordinary water pipe, cracks or splits the repair thereof can be accomplished in a number of ways. For example the split portion can be removed and a sleeve can be slipped over the remaining ends and soldered thereat; or the remaining ends can be threaded and a union joint device can be threaded to these ends. The numerous ways for repairing such a pipe necessitate: a reasonable amount of skill (for example to "wipe" a joint), a reasonable amount of expense (for instance the expense of stocking a variety of sleeves or union joint devices), a reasonable amount of equipment (for instance a tool for threading the remaining ends when a split piece has been removed), and, of course, a reasonable amount of effort and time.

The present invention enables a quick, relatively inexpensive, relatively effortless repair or coupling of a pipe, rod or structure of the like with a minimum amount of skill required.

Accordingly it is an object of the present invention to provide an improved means for repairing or coupling pipes, rods and structures of the like.

Another object of this invention is to provide an inexpensive pipe or rod coupling wherein one size of material fits several sizes of pipe or rod.

It is a further object of the present invention to provide a coupling of dissimilar sizes.

It is a further object of the present invention to provide a repair tape whose adhesive material is capable of being formed into a solid mass.

In accordance with a feature of the present invention there is provided a tape base of metal (such as copper) or of non-metal or of plastic (such as Mylar) which is coated with a formable adhesive such as solder, epoxy resin or the like. The tape is wrapped around the item to be repaired and the adhesive is subsequently formed into a solid mass.

In accordance with another feature of the present invention the tape base is tension formed in a spring-like pattern so that when the tape is wound on an object, it has a self-binding effect which aids the positioning thereof prior to forming the adhesive into a solid mass.

In accordance with another feature of certain embodiments of the present invention, the tape base is either perforated, corrugated or made mesh-like to enable the adhesive to provide a better amalgamation or find a better gripping surface when it is formed into a solid mass.

Figure 1:
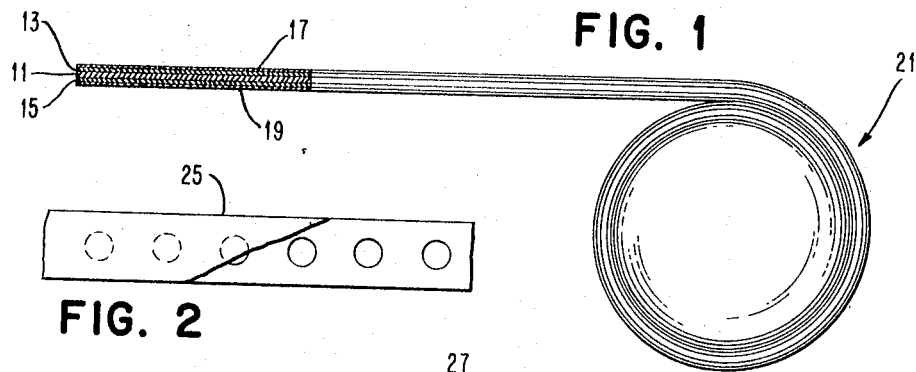
Figure 2:
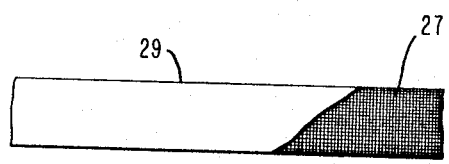
Figure 3:
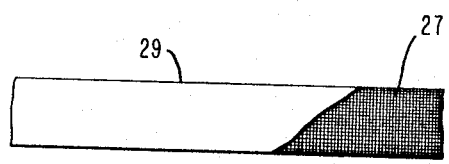
Figure 4:
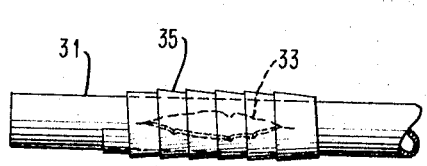
Figure 5:
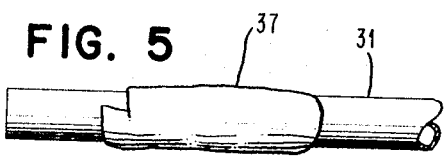
Figure 6:
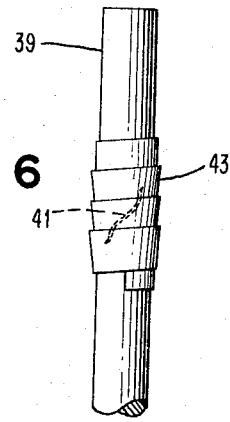
Figure 7:
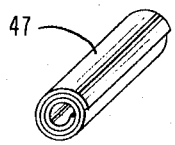
Figure 8:
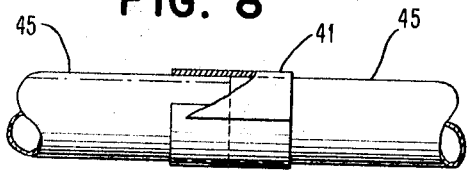

The foregoing and other objects and features of this invention will be best understood by reference to the following description of an embodiment of the invention taken in conjunction with the accompanying drawings, wherein:

FIGURE 1 is a sectional view of a roll or repair tape;
FIGURE 2 is a planar view of a tape whose base has perforations therein with a solder covering thereover;
FIGURE 3 is a planar view of a tape whose base is in mesh form with a solder covering thereover;
FIGURE 4 is a pictorial showing the tape when wound on a pipe with the crack therein;
FIGURE 5 is a pictorial showing the tape of FIGURE 4 after it has been heated and formed into a solid mass;
FIGURE 6 is a pictorial showing the tape wound around a rod which has been broken;
FIGURE 7 is a pictorial of a tension formed or spring loaded tape;
FIGURE 8 shows a coupling around butted ends of two rod sections of dissimilar size.

In a preferred embodiment the tape base is made of thin pliable copper stock. To each surface of the pliable copper stock there is tinned a layer of solder and flux. The tape as fabricated above can be wrapped around a break in a pipe, or the joinder of a break in a rod, and heat is then applied thereto. The solder, of course, melts in response to the application of heat and intermingles with the solder of the layers of the tape wrapped around it as well as coming in contact with the surface of the pipe or the rod about which it is wrapped. Upon cooling the solder forms a solid mass which supports the pipe, or rod structure. In the case of a pipe with a split, the solid mass of solder fills in the gap, or open break, of the pipe wall to withstand any pressure exerted by fluids carried by the pipe. The foregoing can be appreciated when the laminar structure of the tape after fixing is considered. Obviously within the spirit of the present invention other adhesives can be used such as epoxy resin, and other tape materials such as Mylar which are perforated, meshed or corrugated can be used in place of the copper stock.

Consider FIGURE 1 which depicts a tape of copper stock 11 upon which there is tinned two layers of solder 13 and 15. Onto the outer surface of the solder layers 13 and 15 there are spread two layers 17 and 19 of solder flux. The solder flux (which can be any of the well known fluxes such as resin) being tacky serves to help keep the tape rolled together and further serves to clean the surface to which the solder will cling when the tape is heated.

In the preferred embodiment the solder is composed of lead and tin, although it should be understood that other forms of solder such as tin-lead-antimony, tin-silver, tin-zinc, lead-silver or the like can be used. The solder is bonded to the tape base by tinning, evaporation-deposition, electroplating, rolling and the like. When base metals other than copper are used, other solders or brazing alloys may be used.

The solder-tape as depicted in FIGURE 1 is wound in a tape roll 21. In one embodiment the tape roll can be spring loaded; that is, the tape base can be tension formed so that the tape attempts to wind itself in the fashion shown in FIGURE 1 or in a spring-like fashion as shown in FIGURE 7. When the tape is tension formed, it tends to cling to the object about which it is wound thereby having the tape hold its own position prior to being heated to form a solid mass.

FIGURE 2 depicts a perforated tape base 23 upon which there is tinned or electroplated a layer of solder 25. When the tape of FIGURE 2 is wound on the object and heated, the solder oozes or passes, through the holes in the perforated tape onto other layers of solder and onto the object which is being wound by the tape. In this way a cross section intermingling of the tape material is effected which gives added lateral strength to the mass of solder and copper that is formed in response to the heat. The mesh tape 27 with the solder layer 29 secured thereto, as shown in FIGURE 3, can be used in the same fashion as the tape shown in FIGURE 2. The mesh tape base 27 with the solder 29 thereon is wound around the object to be mended and when heat is applied thereto the solder 29 oozes through the mesh to amalgamate or intermingle with the solder of the other side of the mesh and with the solder held by other portions of the mesh tape.

FIGURE 4 shows a pipe 31 which has been cracked and has an open portion 33 shown in phantom under the winding of the tape 35. The tape 35 is originally wound around the pipe 31 to completely cover the break in the pipe 33. Although only one overlap is shown wound around the pipe 31 obviously several layers could be applied, the number depending upon the strength required. The tape 35 is held in position on the pipe 31 either by being tension formed or by being temporarily secured thereto by the adhesive property of the solder flux 19 of FIGURE 1 or held in tension by means of a clamp or pliers. After the tape 35 has been so wound, heat is applied thereto by means of the torch or soldering iron or some other suitable means that will melt the solder such as the layers 13 and 15 of FIGURE 1.

FIGURE 5 depicts the pipe 31 with a solid mass of solder and copper stock adhering thereto. The solder of FIGURE 5 has been melted in response to heat and has spread across the entire layers of the tape to the form the solid mass shown. In FIGURE 5 it can be seen that the solid mass of solder and copper stock is adhering to the pipe 31 and hence is providing a substantially strong structural addition to the pipe to withstand the pressures of fluid passing through the pipe.

While FIGURE 5 has been described as depicting a solder and copper stock mass, it could just as well be showing an epoxy resin and Mylar base cured mass. When adhesives other than metallic alloys are usde, and regardless of the tape material, the adhesive should be of a type that remains pliable and somewhat tacky. In addition the adhesive material should change its state to a hardened mass in response to heat, or to an activator, or both. Certain of the epoxy resins are of this type of material.

For instance if an epoxy resin is used as the adhesive material it can be chosen and compounded to have a hardening agent which will not harden at room temperature but which will harden at a relatively low heat. Polyamide is such a hardener. Polyamide when acting as the hardener renders the epoxy resin flexible and workable at room temperature. However, such an epoxy resin can be cured to a solid mass at approximately 100° F. By way of example such an epoxy resin activator can be secured commercially under the name of Versamid which is manufactured by General Mills, Minneapolis, Minn.

FIGURE 6 shows the rod 39 which has been broken along the line 41 and which is being mended by the tape of the present invention. The rod 39 has been joined together and has had the tape 43 wound therearound to be subjected to a heat process as described earlier and the solder of tape 43 will subsequently melt forming an amalgamated mass of solder and copper stock to form a reinforced portion of the rod thereby mending the break 41.

FIGURE 7 shows a coiled piece of the spring formed metal tape of sufficient length to form a coupling for several different sizes of pipe or rod. It is necessary, under the present art, that an assortment of sizes of couplers be stocked by pipe fitters so that all pipe sizes can be accommodated. With the present invention one size coupler can be employed for several different pipe sizes, thus saving inventory and increasing the versatility of a repair kit.

FIGURE 8 shows a coupling of two pipes, or rods, made by using a coupler of tension formed tape as shown in FIGURE 7. The pipe, or rod, sections are butted together in the usual manner. By way of example of the tension tape utility, the sections are shown in phantom to be of different diameters. When sections of pipes or rods having different diameters are joined, the tape can be wound around the smaller section to make up the difference in diameters. The butting joint may be cut on the bias or otherwise if desired. Sufficient layers of tape, (usually slightly thicker than the pipe thickness) or of a coupler such as the embodiment of FIGURE 7, are wrapped around the abutting sections 45. The joinder is finished by heating, or activating, or both as described above.

While we have described above the principles of our invention in connection with a specific apparatus, it is to be clearly understood that this description is made only by way of example and not as a limitation to the scope of our invention as set forth in the objects thereof and in the accompanying claims.

We claim:

1. Mending tape for use with pipes, rods and the like comprising: base material having two outer surfaces and being formed into a relatively long strand whereby its length is many times longer than its width; said base material being tension formed along its length to cause it to wind itself lengthwise into a spiral pattern; solder material coated on both said outer surfaces.

2. Mending tape for use with pipes, rods and the like according to claim 1 wherein there is further included solder flux material coated on both the surfaces of said solder material.

3. Mending tape for use with pipes, rods and the like according to claim 1 wherein said base material is perforated.

4. Mending tape for use with pipes, rods and the like according to claim 1 wherein said base material is a wire mesh.

References Cited

UNITED STATES PATENTS

| | | | |
|---|---|---|---|
| 1,704,760 | 2/1929 | Packer | 138—99 |
| 2,390,890 | 12/1945 | MacFarland | 228—65 |
| 2,664,844 | 1/1954 | Siegrist et al. | 228—56 |
| 2,924,546 | 2/1960 | Shaw | 138—99 |
| 2,972,657 | 2/1961 | Stemke | 228—56 |
| 3,128,255 | 4/1964 | McGary et al. | 117—161 |

JOHN F. CAMPBELL, *Primary Examiner.*

MARTIN L. FAIGUS, *Assistant Examiner.*